UNITED STATES PATENT OFFICE.

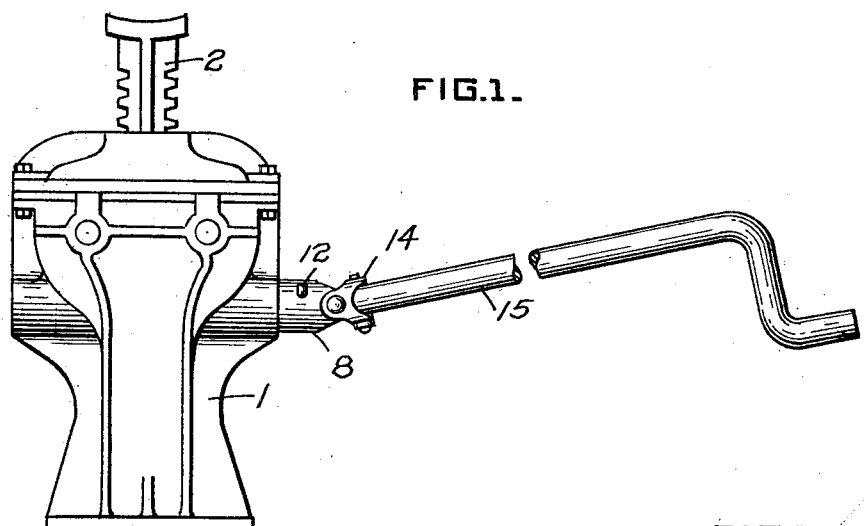
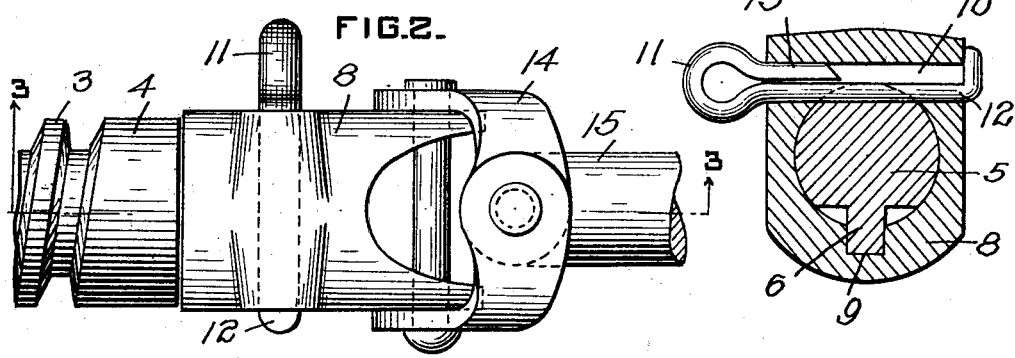
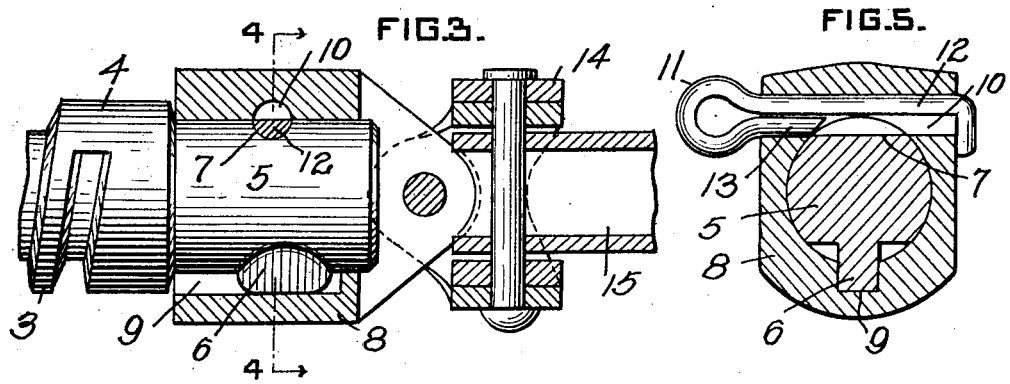

EDWIN E. ARNOLD, OF PITTSBURGH, PENNSYLVANIA, ASSIGNOR TO IRON CITY PRODUCTS COMPANY, A CORPORATION OF PENNSYLVANIA.

DETACHABLE COUPLING.

1,404,260.  Specification of Letters Patent.  Patented Jan. 24, 1922.

Application filed June 4, 1919. Serial No. 301,653.

*To all whom it may concern:*

Be it known that I, EDWIN E. ARNOLD, a citizen of the United States, and a resident of Pittsburgh, in the county of Allegheny and State of Pennsylvania, have made a new and useful Invention in Detachable Couplings, of which the following is a specification.

My invention relates to detachable couplings for connecting a shaft to an extension, a crank handle or similar object.

My object is to provide means so that such parts may be quickly and easily assembled and firmly secured together and as quickly and easily detached.

For the purposes of illustration, I have shown my invention as applied to the shaft and crank handle of a worm gear drive jack and in the accompanying drawings Figure 1 is an elevation of such a jack operated by a crank handle through my coupling; Fig. 2 is a plan of the connection between worm shaft and crank handle shown in Fig. 1; Fig. 3 is a vertical longitudinal section on line 3—3 of Fig. 2; Fig. 4 is a vertical transverse section on line 4—4 of Fig. 3 and showing the coupled parts secured in assembled position and Fig. 5 is a similar section but showing the securing means released to permit removal of the handle.

In the jack illustrated, the housing 1 forms the frame and base for a worm gear mechanism which supports rack 2 and raises or lowers it as is desired. Worm 3 is enclosed in housing 1 but the worm shaft 4 extends outside of housing 1 and terminates in a shouldered end 5. On the side of end 5 there is forged or machined a key 6 as best shown in Figures 3 and 5. Key 6 is rectangular in shape and its length is in a plane of the axis of shaft 4. Opposite key 6 is a semi-circular groove 7 cut transversely in end 5 with its center line tangent to the latter's surface. Key 6 and groove 7 may be variously located on end 5 both lengthwise and circumferentially and independently of each other. I have shown them approximately midway of the length of end 5 and diametrally opposite each other simply to make the drawings in the clearest manner.

A member 8 has a socket opening at one end large enough to slide over end 5. On its inner periphery is a longitudinal keyway 9 large enough to admit key 6. Opposite keyway 9 and transversely of member 8 is a hole 10 with its center line tangent to the periphery of the socket. When member 8 is slipped over end 5 it must be turned until key 6 enters keyway 9 and when the two parts have been telescoped the hole 10 will aline with groove 7.

In hole 10 is a spring cotter pin 11. One leg 12 of pin 11 extends through member 8 and is bent inwardly at right angles to engage the outside face of the latter to prevent the pin's withdrawal. The other leg 13 of pin 11 terminates, as shown in Fig. 5, where it intersects the socket periphery. Pin 11 is inserted through hole 10 and bent as shown before the socket member and shaft end are assembled.

To assemble shaft and socket, cotter 11 must be turned as shown in Fig. 5. In this position, leg 12 clears shaft end 5 and the two pieces may be telescoped until groove 7 and hole 10 are alined. Cotter pin 11 is then gripped by its eye and turned half way around which brings it to the position shown in Figs. 3 and 4 where it fills groove 7 and becomes substantially a dowel pin through the members preventing their relative longitudinal movement. Turning of socket member 8 will drive shaft 4 through key 6.

As cotter pin 11 is of spring material and its legs 12 and 13 are always confined, their opposing tendencies will serve to take up any play between the shaft end and the socket.

In the drawing, socket member 8 forms part of a universal joint. The other part 14 of the joint is provided with an extension handle 15 by which the socket member and shaft may be operated to raise or lower the jack.

It is apparent that one handle terminating in such a socket member will suffice for any number of jacks as it may be attached or detached by sliding on or off and when attached may be easily locked in position or unlocked by giving cotter pin 11 a half turn; but whether several jacks are used or only one, the ease and speed with which the handle and jack may be detached from each other for more compact storing is a decided advantage, especially when carried as part of an automobile or truck equipment.

In manufacture, I prefer to utilize key 6 to take the rotative stress between shaft and handle, but if the key were omitted, cotter 11 would similarly function, although likely subject to excessive wear and stress, and other engaging means to supplant key 6 could be applied and I do not regard it as an essential part of the coupling.

I claim:—

1. In combination in a coupling, a socket member adapted to receive a shaft and having a longitudinally extending key-receiving groove formed in an inner surface thereof and aligned pin-receiving apertures formed in the wall thereof, each opening into the shaft-receiving socket thereof, a shaft fitted into the socket of the socket member and provided with a longitudinally-extending key fitting into said groove, and a pin-engaging surface formed thereon, and a half round pin extending through said pin-receiving apertures and resilient means secured to said pin and bearing against the face of one aperture and forcing said pin into frictional engagement with said surface or with the walls of said apertures.

2. In combination in a coupling, a socket member adapted to receive a plug member, a plug member fitted into the socket of said socket member, aligned pin-receiving apertures formed in the wall of said socket member and so located that the cylindrical plane defined by the inner surfaces of said apertures partially intersects the cylindrical plane defined by the inner face of the socket, a half round key extending through said apertures secured to said member, and turnable to a position in which it is located outside the cylindrical plane defined by the inner face of said socket and to a position in which it extends across the interior of the socket and engages a surface formed on said plug member, and resilient means formed integrally with said pin and engaging one of the apertures to force said pin into frictional engagement with the parts contacting therewith.

3. In combination in a coupling, a socket member adapted to receive a plug member, a plug member inserted into the socket of the socket member, means for locking said members against relative rotation, and a half round key extending through the walls of said socket member, secured thereto and movable to a position in which a portion thereof extends across the socket and engages a surface on said plug member, and to a position in which it disengages the surface of the plug member, and resilient means associated with said pin and engaging one of the pin-receiving apertures formed in the wall of the plug member for holding the pin in position by a frictional gripping of the wall of said plug member.

In testimony whereof, I have hereunto subscribed my hand this 19th day of May, 1919.

EDWIN E. ARNOLD.